United States Patent [19]

Rosaen

[11] Patent Number: 5,128,032
[45] Date of Patent: Jul. 7, 1992

[54] VIBRATING SIEVE FILTER WITH BARS

[75] Inventor: Borje O. Rosaen, Ann Arbor, Mich.

[73] Assignee: Rosedale Products, Inc., Ann Arbor, Mich.

[21] Appl. No.: 601,195

[22] Filed: Oct. 19, 1990

Related U.S. Application Data

[63] Continuation-in-part of Ser. No. 323,415, Mar. 14, 1989, Pat. No. 4,970,004.

[51] Int. Cl.⁵ .................................. B01D 33/54
[52] U.S. Cl. .................................... 210/232; 210/388; 210/397; 210/409; 210/433.1; 210/450; 210/452; 210/454; 210/497.01
[58] Field of Search .............. 210/232, 305, 312, 313, 210/388, 407, 409, 416.1, 418, 438, 450, 452, 454, 497.01, 251, 541, 397, 433.1; 55/292, 293, 300, 304, 525; 209/268, 273, 305, 306, 379

[56] References Cited

U.S. PATENT DOCUMENTS

| | | | |
|---|---|---|---|
| 3,161,591 | 12/1964 | Petter et al. | 210/251 |
| 3,195,729 | 7/1965 | Kracklauer et al. | 210/330 |
| 3,317,050 | 5/1967 | Daman | 210/331 |
| 3,387,712 | 6/1968 | Schrink | 210/411 |
| 3,867,291 | 12/1975 | Schmidt, Jr. et al. | 210/136 |
| 3,870,640 | 3/1975 | Reece | 210/388 |
| 3,970,549 | 7/1976 | Ennis et al. | 210/388 |
| 4,419,240 | 12/1983 | Rosaen | 210/452 |
| 4,836,922 | 6/1989 | Rishel et al. | 210/388 |
| 4,904,394 | 2/1990 | Clarke et al. | 210/739 |
| 4,970,004 | 11/1990 | Rosaen | 210/741 |

FOREIGN PATENT DOCUMENTS 129179 2/1987 U.S.S.R. .................. 210/388

Primary Examiner—Robert A. Dawson
Assistant Examiner—Matthew O. Savage
Attorney, Agent, or Firm—Gifford, Groh, Sprinkle, Patmore and Anderson

[57] ABSTRACT

A vibrating sieving unit for insertion into a housing to form a sieving filter. An air pressure operated vibrator directly vibrates the sieving cylinder to reduce the buildup of filter cake for improved performance. Tuning bars connected between the cover and the vibrator are structurally matched to the fluid being filtered and to the particular vibrating assembly to create a harmonic vibration and to thereby achieve a consistent, maximum vibration at a given, readily maintainable air pressure.

13 Claims, 1 Drawing Sheet

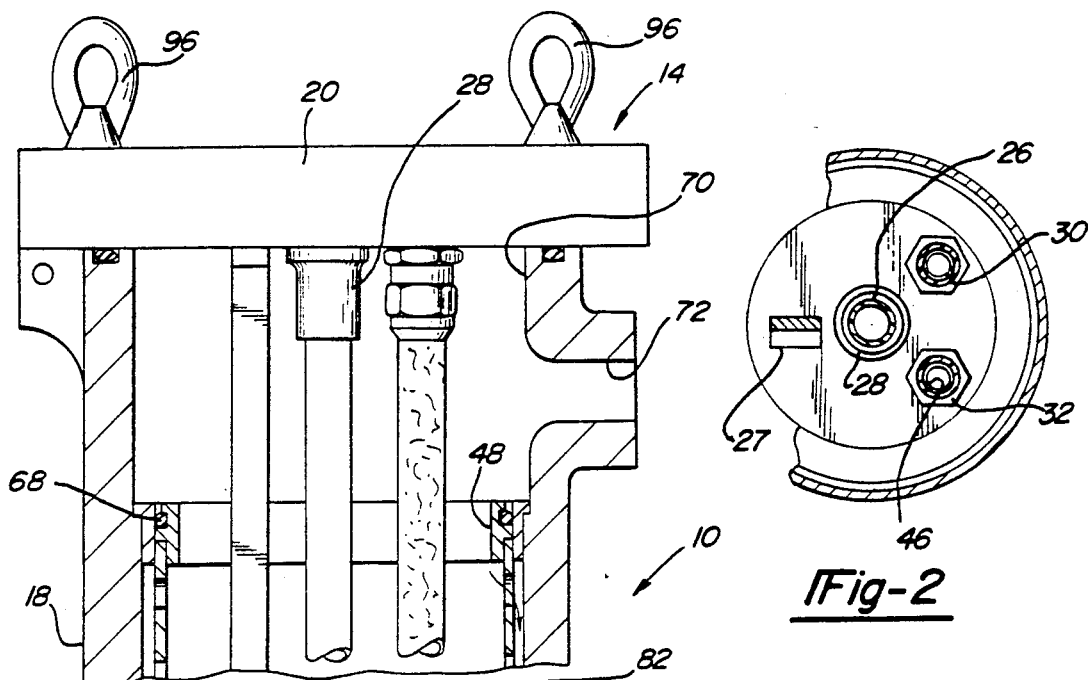
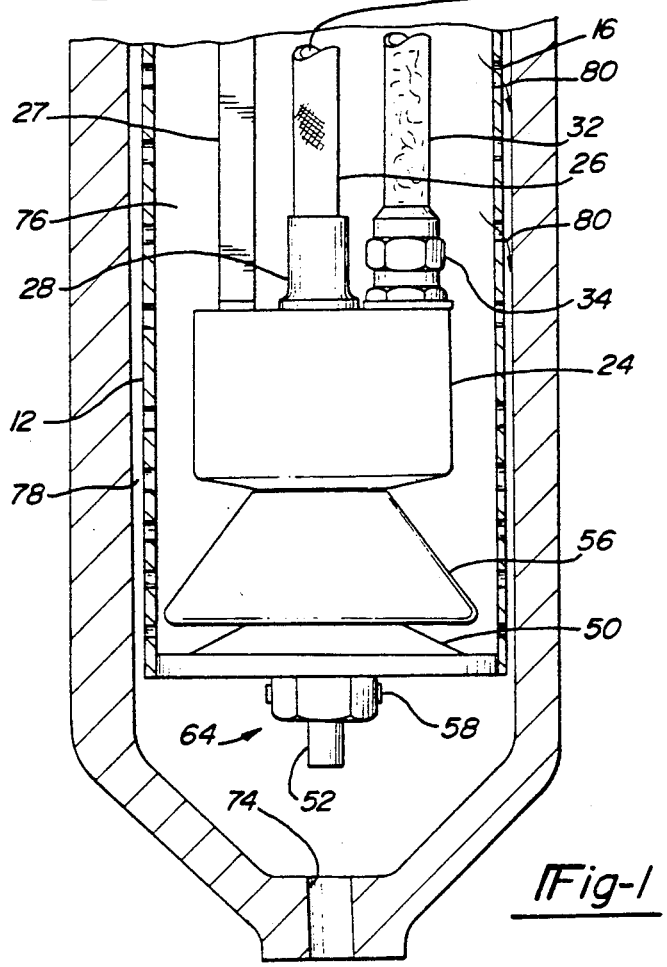
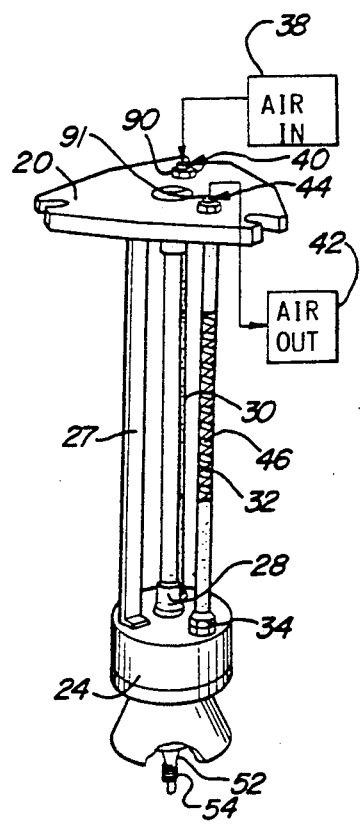
Fig-1
Fig-2
Fig-3

VIBRATING SIEVE FILTER WITH BARS

CROSS REFERENCE TO RELATED APPLICATION

This is a continuation-in-part application of Ser. No. 07/323,415 filed Mar. 14, 1989, for a Vibrating Sieve Filter now U.S. Pat. No. 4,970,004 issued Nov. 13, 1990.

BACKGROUND OF THE INVENTION

1. Field of the Invention

This invention relates to filtering of liquids, and, more particularly, to a vibrating sieve filter having means for vibration damping to thereby produce a maximum speed of vibration for the particular vibrating filter assembly.

2. Description of the Prior Art

Liquids used in industrial processes often require selective filtering to eliminate only the undesirable contaminate particles. Typically, this is accomplished with a bag type semi-permanent or disposable filter in which the liquid being filtered is passed through a bag in a basket support. Alternatively, disposable cartridge filters of various configurations are used. The surfaces of these types of filters become quickly clogged with materials including those the removal of which is not desired.

Improved performance in filtration has been accomplished in many instances by the adaption of sieving techniques. A cylindrical perforated steel basket with a screen covering replaces the cloth or paper composition bag. The cylindrical screen is placed in a cylindrical casing or housing and the liquid to be filtered is generally admitted at the bottom of the housing for flow through the screen to the interior of the screen cylinder and upwardly to a top outlet. In some instances a space is left between the bottom of the screen cylinder and a housing to provide a vibrator which induces vibration into the incoming liquid helping to keep the smaller particles in suspension for improved sieving.

This invention is directed to an improved type of sieving filter and to improved techniques for using vibration. A bar or bars are used to dampen the screen cylinder motion to thereby provide frequency of vibration of the filter unit to produce maximum speed of vibration for that particular unit.

SUMMARY OF THE INVENTION

The foregoing improvements and other advantages of the invention have been embodied in a vibratory sieve unit which is inserted into a housing to form a sieving filter. The sieving filter can be supplied complete with the housing, seals and other accessories such as valves, or the sieving unit can be incorporated in an installed housing previously employing a bag type filtering unit or a sieve type unit.

The vibrating sieve unit includes a closure for sealing the open top of the housing. In the case of a new installation, the closure is in the form of a simple cover employing an O-ring to seal to a generally cylindrical housing. A sieving cylinder having an open top and a closed bottom is attached to the closure by the means of a longitudinally extending support member which is connected at one end to the closure and at the other end to the bottom of the sieving cylinder. A fluid actuated vibrator is attached to the support member adjacent to the bottom of the sieving cylinder for supplying vibrations to the cylinder. One or more longitudinally extending tuning bars connect the vibrator to the cover. A pair of longitudinally extending resilient conduits are connected between the closure and the vibrator for supplying and exhausting a motive fluid for operation of the vibrator. Normally, the motive power is clean factory air at 25-60 psi.

The size and material of the filter determine the harmonic vibration frequency for a particular filter assembly. It is desirable to vibrate the filter at twice the resonance frequency, called the first harmonic frequency, to achieve the maximum speed of the filter vibration. Therefore, the tuning bars are matched to the particular filter unit to dampen the complete vibrating filter assembly to achieve the first harmonic frequency for a particular assembly at a given range of air pressure provided to the air motor acting to vibrate the filter unit assembly.

The generally cylindrical housing has an open top and a horizontal inlet through the side wall adjacent the top for the fluid being filtered. The bottom of the housing is closed with a filtered fluid outlet. The vibrating sieve unit is inserted into the housing with the seal between the housing and the sieving cylinder, located so that the fluid being filtered, which is introduced through the inlet, will be directed into a first chamber inside of the sieving cylinder. The fluid, along with the smaller particles, desirably retained then passes through the sieving cylinder with the larger particles being removed by the sieve falling to the bottom of the cylinder. The fluid passes into a second chamber between the sieving cylinder and the housing and then is exhausted through the filtered fluid outlet. The vibration is supplied directly to the sieving cylinder to prevent buildup of a filter cake of small particles on the surface and to promote the passage of the filtered fluid with particles below a given size through the sieve cylinder. The tuning bar or bars extending between the cover and the vibrator are sized to dampen the motion of the filter and to produce the first harmonic frequency at a given, easily achievable psi of the air motor producing the vibration. This produces a maximum frequency vibration of the filter unit device.

Because the sieving cylinder of the filter is directly vibrated it becomes ideal for paints, medicines, paper coatings, foods and other products containing desirable solids that can be classified by size. For example, metallic automotive paints use mica particles as an ingredient. Larger particles clog the spraying nozzles. Contact of most of the larger mica particles with the vibrating sieving cylinder actually breaks them down to a size which will pass through the cylinder and not clog the paint spraying nozzles. The larger particles will be retained in the sieving cylinder as a "contaminate".

A quick disconnect device is used for attaching the closure to the top of the housing. Preferably, this takes the form of three swinging eye bolts attached to the casing which draw the closure down in sealing relationship to the housing with the tightening of yoke-type nuts. External air supply and exhaust lines to the closure are normally made with flexible tubing so that the closure is easily removed from the casing carrying the entire vibrating sieve unit with it.

The sieving cylinder is attached to the vibrator casing which forms a part of the support member by a tapered plug connector which transmits the vibrations from the vibrator unit to the sieving cylinder but allows easy detachment for cleaning of the sieving cylinder or replacement thereof. The sieving cylinder can also be easily cleaned while still assembled to the sieve unit by inserting the cylinder into a solvent container with the vibrator operating to quickly dislodge the contaminate from the sieving cylinder mesh.

A contaminate effluent line extends from a point close to the bottom of the sieving cylinder through the closure for discharging a flow of fluid carrying particulate contaminate matter during a cleaning-in-place purging cycle. The sieving cylinder support member is in the form of a pipe which serves a dual purpose of providing support for the sieving cylinder and providing the effluent line.

When the sieving filter is installed, a valve is placed in the line attached to the filtered fluid outlet and in the contaminate effluent line. A differential pressure gauge is normally supplied between the fluid inlet and outlet to the filter. When the pressure drop across the filter increases to a preset value, typically 20 psi, this is an indication that the sieving cylinder has been clogged with accumulated contaminate so that a purging cycle is necessary. The cleaning-in-place cycle is initiated by closing the valve in the filtered fluid outlet line and opening the valve in the contaminate effluent line. The normal flow of fluid being filtered passes through the housing inlet into the inside of the sieving cylinder where it flows downwardly to pick up particulate contaminate matter along the inside surface of the sieving cylinder. A cone deflector at the bottom of the vibrator deflects this flow downwardly against the closed bottom of the sieving cylinder to pick up additional accumulated particulate contaminate. Entrance to the effluent line is within the cone deflector so that the liquid carries the contaminate from the bottom of the sieving cylinder through the closure at the top to a discharge line.

The foregoing advantages and others will become more apparent from the following description and the accompanying drawing.

BRIEF DESCRIPTION OF THE DRAWINGS

FIG. 1 is a front elevational view partially in section, showing the vibrating sieve unit of this invention inserted into a housing to form the sieving filter of the invention, and additionally showing the use of a tuning bar connected between the cover and the vibrator according to the new method of this invention;

FIG. 2 is a top view partially in section of the sieving filter of this invention showing the construction of the vibrating sieve unit and its insertion and the attachment of the tuning bar to the cover; and FIG. 3 is a perspective view showing the tuning bar of the vibrating sieve unit of this invention.

DETAILED DESCRIPTION OF THE PREFERRED EMBODIMENTS OF THE INVENTION

Referring to FIG. 1, the sieving filter 10 of this invention is shown as including the vibrating sieve unit 12 which is inserted into housing 18 having a horizontal inlet 72 and a filtered fluid outlet 74 to form the completed sieving filter.

The vibrating sieve unit includes a closure 14, which in the case of the complete sieving filter 10 shown in FIG. 1 is a simple cover plate 20.

The vibrator unit 24 is assembled to the closure 14 by a longitudinally extending support member 26 which takes the form of a pipe assembled to the closure and vibrator unit by fittings 28. One or more longitudinally extending tuning bars 27 connect the vibrator 24 to the closure 14. The vibrator 24 is a commercially available turbine driven type. Resilient tubing is used for the fluid inlet conduit 30 and exhaust conduit 32 which are connected by suitable fittings 34 to the closure 14 and vibrator 24. Typically, the motive fluid for the vibrator 24 is clean available plant air at 25-60 psi, shown supplied at 38 through an inlet port 40 in closure 14. The air is exhausted at 42 through an exhaust port 44 in closure 14. The air pressure is varied between 25 and 60 psi to change the vibration frequency to the frequency best suited for the product being filtered. Frequency increases with increase in pressure. The longitudinally extending tuning bars 27 connect the vibrator 24 to the closure 14, and are structurally matched to the filter and interact with the fluid to effect damping to create a first harmonic vibration for the particular filter assembly. Where a particularly heavy filter assembly is utilized, it may be necessary to utilize two or more tuning bars 27.

Reinforcing springs 46, as best shown in FIG. 3, are used inside of the fluid conduits 30 and 32 to prevent collapse of these resilient tubes which may have very little internal air pressure but which are exposed to the filter fluid pressure which may be much higher.

Sieving cylinder 16 has an open top 48 and a closed bottom formed by plate 50. The sieving cylinder is typically a stainless steel basket having large perforations of the order of $\frac{1}{8}$ inch diameter for unimpeded flow of fluid. The basket is lined with a filtering sieve element which controls the maximum size of particles which pass through the sieving cylinder. Wedgewire-lined and wire cloth lined baskets are readily available with a variety of opening sizes. The wedgewire-lined baskets have greater abrasion resistance, while the wire cloth lined baskets present a much higher percent open area so that with a given flow the fluid passes through the sieving filter with less pressure drop. Since the particular structure of the basket lining is not part of the claimed invention, the sieving cylinder is shown as an integral structure.

The sieving cylinder 16 is attached to the support member 26 by a locking means 64 consisting of a tapered plug 52 and a threaded nut 58, as best seen in FIG. 1. The tapered plug 52 has a threaded portion 54 as shown in FIG. 3 onto which the nut 58 is threaded. A conical deflector 56 is held in firm connection to the vibrator 24 by this locking means 64 close to the bottom plate 50. This locking means 64 transmits the vibration of vibrator 24 to the sieving cylinder 16, which vibrates about O-ring seal 68 between the sieving cylinder 16 and housing 18. The use of resilient tubing for the vibrator conduits 30 and 32 in combination with seal 68 provides a resilient mounting for the sieving cylinder 16.

Vibrating sieve unit 12 is assembled by insertion of the sieving cylinder 16 through the open top 70 of casing 18. Seal 68 engages the housing wall. The flow of fluid during filtering is into sieving cylinder 16 to a first chamber 76 within the cylinder 16 and out through the sieving cylinder 16 to a second chamber 78 between the sieving cylinder 16 and the housing 18. This flow of fluid from the first chamber within the sieving cylinder through the sieving cylinder wall to the second chamber is shown by the arrows 80 in FIG. 1. The larger particles which are screened out by the sieving cylinder 16 fall to the bottom of the sieving cylinder. The positive vibration of the cylinder reduces the buildup or caking of finer particles against the sieve openings allowing the finer material to pass through with the liquid being filtered.

Actuation of the vibrator unit 24 produces vibrating of the sieve unit 12 at a speed which corresponds to the air pressure supplied to the vibrator unit 24. As the air pressure is increased, the speed of vibration of the sieve unit 12 is also increased. At some particular speed, the vibration amplitude increases considerably. This is the resonance speed or resonance frequency. The speed at which this phenomenon occurs depends upon the "springiness" of the particular vibrating filter assembly. Above or below the resonance speed, the amplitude of filter vibration is smaller.

Although it would appear to be desirable to run the vibrating filter at its resonance speed, that speed is quite low for a filter of useful size. The low resonance speed requires a low compressed air pressure to produce that speed. Keeping the air pressure constant at such low level becomes a control problem. Rotating friction also becomes a significant and undesirable variable.

If air pressure to the unit is gradually increased, vibrational speed also increases. At an air pressure and vibrational speed about twice as high as resonance speed another stable condition is reached. This is the first harmonic speed and this is the speed that Applicant achieves by damping with the use of one or more tuning bars 27.

At the air pressure setting for the first harmonic speed, conditions become stable. The same air pressure always produces nearly the same vibration speed. Moderate changes in air pressure produce only small changes in vibration rate. A return to the standard pressure setting causes the vibration to return to the standard speed. At this condition, the amount of vibration is consistent, and the speed is the maximum for a particular range of air pressure. This is achieved by utilizing the tuning bars 27 to in effect vary the "springiness" of the vibrating sieve assembly, and to tune the assembly to a particular air pressure to produce first harmonic resonance of the assembly at a given readily maintainable air pressure.

The foregoing detailed description of the structure and operation of the present invention has been given for clearness of understanding only and no unnecessary limitations should be understood therefrom. Some modifications will be obvious to those skilled in the art to which the invention pertains, without deviation from the spirit of the invention as defined by the scope of the dependent claims.

I claim:

1. A vibrating sieve unit for insertion into a housing to form a sieving filter, said housing having an open top with an inlet adjacent thereto for fluid to be filtered and a closed bottom with a filtered fluid outlet, said unit comprising, in combination:
   closure means for sealing the open top of said housing;
   a sieving cylinder having a closed bottom;
   a longitudinally extending support member extending through said sieving cylinder;
   means for attaching said support member at one end to said closure means and at the other end to said closed bottom of said sieving cylinder;
   a fluid actuated vibrator attached to said support member for vibrating said sieving cylinder;
   a pair of longitudinally extending resilient conduits connected between said closure means and said vibrator for supplying and exhausting motive fluid for operation of said vibrator;
   means for creating a first harmonic damped motion comprising one or more longitudinally extending bars within said sieving cylinder having one end connected to said closure means and the other end connected to said vibrator, said one or more longitudinally extending bars being radially displaced from said support member;
   means for attaching said closure means to the open top of said housing with said sieving cylinder within said housing to complete assembly of said sieving filter; and
   sealing means between said housing and said sieving cylinder located so that fluid being filtered introduced through said inlet will be directed into a first chamber inside of said sieving cylinder, through said sieving cylinder into a second chamber between said sieving cylinder and said housing, and out of said second chamber through said filtered fluid outlet.

2. The vibrating sieve unit of claim 1 wherein said means for attaching said closure means to the top of said housing includes a plurality of swinging eye bolts acting between said housing and said closure means.

3. The vibrating sieve unit of claim 1 wherein said closure means includes a cover for sealing directly to said housing said cover having inlet and outlet ports therethrough to which said resilient conduits are connected for connection to external fluid supply and exhaust lines.

4. The vibrating sieve unit according to claim 1 wherein the means for attaching said support member to the bottom of said sieving cylinder includes a tapered plug and socket assembly.

5. The vibrating sieve unit according to claim 1 further including a contaminate effluent line extending from adjacent the bottom of said sieving cylinder through said closure means for discharging a flow of fluid from said inlet through said first chamber as it picks up particulate contaminate matter from said sieving cylinder and said first chamber.

6. The vibrating sieve unit according to claim 5 wherein said contaminate effluent line is contained at least in part within said longitudinally extending support member.

7. The vibrating sieve unit according to claim 6 further including a conical deflector connected to said support member for directing the flow of fluid within said first chamber toward the bottom of said sieving cylinder into said effluent line.

8. The vibrating sieve unit according to claim 7 wherein said conical deflector is further attached to said vibrator, said conical deflector diverging outwardly from said vibrator towards said sieving cylinder bottom; and said effluent line passes through said vibrator terminating at a point near said sieving cylinder bottom.

9. A vibrating sieving filter comprising, in combination:
   a generally cylindrical housing having a generally vertical axis said housing having an open top with a horizontal inlet adjacent said top for fluid being filtered and a closed bottom with a vertically disposed filtered fluid outlet;
   a cover for sealingly closing the open top of said housing;
   a sieving cylinder having an open top and a closed bottom;

a longitudinally extending support member extending through said sieving cylinder removably attached at one end to said closed bottom of said sieving cylinder and attached at the other end to said cover to support said sieving cylinder concentrically within said housing;

a resilient seal between said housing and said sieving cylinder located adjacent the open top of said sieving cylinder and below said horizontal inlet in said housing so that fluid being filtered which is introduced through the inlet will be directed into the open top of said sieving cylinder into a first chamber inside of said sieving cylinder, through said sieving cylinder to a second chamber between said sieving cylinder and said housing, and out of said second chamber through said filtered fluid outlet;

a fluid actuated vibrator attached to said support member for vibrating said sieving cylinder, said resilient seal serving as a vibration fulcrum point;

means for creating a first harmonic damped motion of said sieving cylinder comprising one or more longitudinally extending bars connected at one end to said cover and at the other end to said vibrator;

a pair of longitudinally extending resilient conduits connected between said cover and said vibrator for supplying and exhausting motive fluid for operation of said vibrator; and quick disconnect means for attaching said cover to said housing so that said sieving cylinder is easily removed with said cover as a unit from said housing permitting said sieving cylinder to be removed from said support member for cleaning and servicing said sieving cylinder and vibrator.

10. A filter device including a housing having an open top, an inlet and an outlet and a fluid chamber disposed between said inlet and said outlet, cover means for closing said open top,
- a filter element disposed within said fluid chamber between said inlet and said outlet to filter fluid chamber between said inlet and said outlet to filter fluid flowing through said filter device between said inlet and said outlet,
- means for vibrating said filter element, and
- means for tuning said filter element to achieve a resonance speed of said vibrating filter element, said means for tuning having at least one bar connecting said means for vibrating to said cover means.

11. The filter device as defined in claim 10 and in which said vibrating means includes an air actuated vibrator and said tuning means produces a resonance frequency of said filter element at a given range of air pressure provided to said air actuated vibrator.

12. A filter device including a housing having an open top, an inlet and an outlet and a fluid chamber disposed between said inlet and said outlet, cover means for closing said open top,
- a filter element disposed in said fluid chamber between said inlet and said outlet to filter fluid flowing through said filter device between said inlet and said outlet,
- means for vibrating said filter element, and
- means for tuning said filter element to achieve a first harmonic speed of said vibrating filter element, said means for tuning having at least one bar connecting said means for vibrating to said cover means.

13. The filter device as defined in claim 12 and in which said vibrating means includes an air actuated vibrator and said tuning means produces a first harmonic speed of said filter element at a given range of air pressure provided to said air actuated vibrator.

* * * * *